United States Patent Office 3,271,167
Patented Sept. 6, 1966

3,271,167
BEEF-TYPE FLAVORING COMPOSITION,
SOUP AND GRAVY
Marcel A. Perret, Greenwich, Conn., and John Raymond McMahan, Freeport, N.Y., assignors to Chas. Pfizer & Co., Inc., New York, N.Y., a corporation of Delaware
No Drawing. Filed June 17, 1963, Ser. No. 288,518
6 Claims. (Cl. 99—140)

This invention relates to new and useful flavoring compositions. More particularly, it is concerned with flavoring compositions comprised of mixtures of salts of α-ketobutyric acid, 5'-ribonucleic acids and glutamic acid, which are useful in imparting a beef-type flavor to foods.

The beef flavor in many commercially-available foods such as soups and gravies is obtained by the incorporation therein of a product known as beef extract. Beef extract is prepared by a time-consuming and expensive process which generally comprises acid hydrolysis of the meat tissue from slaughtered cattle. In a commonly employed commercial procedure, the meat is hydrolyzed with hydrochloric acid and then the mixture is neutralized and concentrated until the liquid portion has largely evaporated and there remains as a brown and substantially completely hydrolyzed residue, the so-called beef extract. This procedure is expensive in that it requires fairly large equipment and much heat to convert a large quantity of beef tissue into the relatively small quantity of concentrated extract which is finally obtained.

Beef extract is a commodity which is normally imported into the United States from areas where meat is relatively low in cost and the processing costs are minimized. As with many imported commodities, the price of beef extract tends to fluctuate with the season of the year and is sometimes affected by the competitive demand for cuts of meat for table use. Furthermore, it is noticed that the quality of the extract tends to vary since the manufacturers of the extract are forced at times to use predominantly poorer cuts of meat for extract preparations. This generally results when prevailing market conditions force prices of the better cuts too high. As a result of these problems, means have long been sought to free food processors from their dependence on beef extract. It has now been found that through use of the flavoring compositions of the instant invention it is possible to dispense with beef extract in the preparation of beef-flavored foods. This is accomplished by replacing beef extract with commercially-available chemical raw materials which are stable in price and which are expected to be availaable at steadily decreasing prices in the future. A particularly important advantage of the new compositions is found in a comparison of their price with that of beef extract; the use of beef extract in the preparation of foods costs about three times as much as the use of the flavoring compositions of this invention.

It is, therefore, a principal object of the instant invention to provide a meatless beef-flavored composition which can replace all or part of beef extract in food.

A further object of this invention is to provide a composition for obtaining meatless beef-flavored foods at a substantial savings in cost.

A still further object of the instant invention is to provide a flavoring composition which is of uniform quality, is readily available in all seasons and is economical to use.

These and other objects of the instant invention are readily obtainable through use of the composition of this invention which is, in essence:

(a) A compound selected from the group consisting of α-ketobutyric acid and physiologically-acceptable salts thereof;

(b) A compound selected from the group consisting of inosinic acid and physiologically-acceptable salts thereof in an amount to provide from about 4 to about 100 parts by weight based on said α-ketobutyrate; and (c) A compound selected from the group consisting of glutamic acid and physiologically-acceptable salts thereof in an amount to provide from about 20 to about 1500 parts by weight based on said α-ketobutyrate and from about 5 to about 15 parts by weight based on said inosinate.

This invention also contemplates soups containing as their principal beef flavor-imparting ingredients:

(a) A compound selected from the group consisting of α-ketobutyric acid and physiologically-acceptable salts thereof;

(b) A compound selected from the group consisting of inosinic acid and physiologically-acceptable salts thereof in an amount to provide from about 4 to about 100 parts by weight based on said α-ketobutyrate; and (c) A compound selected from the group consisting of glutamic acid and physiologically-acceptable salts thereof in an amount to provide from about 20 to 1500 parts by weight based on said α-ketobutyrate and from about 5 to about 15 parts by weight of said inosinate.

In addition, the instant invention contemplates gravies containing as their principal beef flavor-imparting ingredients:

(a) A compound selected from the group consisting of α-ketobutyric acid and physiologically-acceptable salts thereof;

(b) A compound selected from the group consisting of inosinic acid and physiologically-acceptable salts thereof in an amount to provide from about 4 to about 100 parts by weight based on said α-ketobutyrate; and (c) A compound selected from the group consisting of glutamic acid and physiologically-acceptable salts thereof in an amount to provide from about 20 to about 1500 parts by weight based on said α-ketobutyrate and from about 5 to about 15 parts by weight of said inosinate.

The ingredients of the above-mentioned compositions are readily obtainable either commercially, or by synthesis.

The term "physiologically-acceptable salts" as used herein and in the appended claims contemplates non-toxic alkali metal, alkaline earth metal and organic base salts of α-ketobutyric acid; 5'-ribonucleotides, of which inosine-5'-phosphoric acid, also well-known in the art as inosinic acid, is a member of specific importance; and glutamic acid. Particular mention is made of the sodium and calcium salts, which are desirable because of their ready availability and low toxicity. Also important are the potassium salts, the ammonium salts and the salts with glycine and other non-toxic organic bases.

It has been found that, in addition to, or in place of inosinic acid, other 5'-ribonucleotides may be employed in the practice of the instant invention. In this connection, special mention is made of certain other 5'-ribonucleotides derivable from a commonly employed source of inosinic acid, namely yeast ribonucleic acid: cytidine-5'-phosphoric acid, uridine-5'-phosphoric acid and guanosine-5'-phosphoric acid; this latter substance is commonly referred to as guanylic acid.

It is critical to the invention that all three substances, set forth hereinabove in categories (a), (b) and (c), be present in the flavoring composition in order to serve adequately as a replacement for beef extract. For example, in taste panel testing of the replacement of beef extract in a soup-base with flavoring compositions, the herein disclosed and claimed mixture with α-ketobutyric acid or its salts is completely acceptable while mixture without the said α-ketobutyrates is not an adequate replacement at all.

For the practice of this invention it is important to maintain the ratio of α-ketobutyrate to inosinate as disclosed herein and as set forth in the appended claims. If more than 100 parts of inosinic acid or its salt per one part of α-ketobutyric acid or its salts is used, even experienced taste panels have difficulty in discriminating the beneficial effect imparted by the addition of the α-ketobutyrate. If, on the other hand, the amount of inosinic acid or its salts is such as to provide less than 4 parts per part of α-ketobutyric acid or its salts, there begins to be noticed a distinct sweet taste which is described as somewhat maple-like.

It is very desirable to the attainment of a well-balanced beef flavor to select an amount of glutamic acid or salt thereof which will provide from about 20 to about 1500 parts by weight of the flavoring composition based on the α-ketobutyric acid or salt thereof present. Furthermore, the best balance of flavor and economy appears to be obtained when approximately 10 parts of glutamic acid or salt thereof are present to each part of inosinic acid salt although wholly acceptable compositions contain from about 5 to about 15 parts of glutamate per part of inosinate. Therefore, the concentration of the individual components of the flavoring composition contemplated by the instant invention lies within the range of about one part of α-ketobutyric acid to 4 parts of inosinic acid to 20 parts of glutamic acid at the one extreme to about one part of α-ketobutyric acid to 100 parts of inosinic acid to 1500 parts of glutamic acid at the other, and these ratios hold for the physiologically-acceptable salts as well. It is found that a particularly effective ratio for beef-flavored bouillon or for beef-flavored gravy is 1:4.55:38 parts of α-ketobutyric acid per part of inosinic acid per part of glutamic acid, or salts thereof, respectively.

The flavoring compositions may be employed either in the form of substantially dry crystals or may be used in solutions.

When the flavoring composition is used as a replacement for beef extract, a certain amount of adjustment in the concentration may be needed depending on individual preference and the nature of the final product, in order to arrive at the most desirable flavor or essence. These adjustments are well within the ability of those skilled in the art and, as is obvious, the need for such adjustments by the consumer is largely obviated by providing a synthetic mixture of this invention with a flavoring strength equivalent to that of beef extract. Such a composition can readily be made by suitable selection of concentrations and will be exemplified hereinafter.

The instant invention, in addition to providing new flavoring compositions, also contemplates a process for the preparation of a beef-flavored gravy base with a roast meat flavor and odor. The said process comprises, in essence, heating:

(a) A compound selected from the group consisting of α-ketobutyric acid and physiologically-acceptable salts thereof;

(b) A compound selected from the group consisting of inosinic acid and the physiologically-acceptable salts thereof in an amount to provide from about 4 to about 100 parts by weight based on said α-ketobutyrate;

(c) A compound selected from the group consisting of glutamic acid and physiologically-acceptable salts thereof in an amount to provide from about 20 to about 1500 parts by weight based on said α-ketobutyrate and from about 5 to about 15 parts by weight based on said inosinate; and (d) An edible fat in an amount to provide at least about 20 parts by weight based on said α-ketobutyrate to a temperature of at least about 110° C. and maintaining said temperature for at least about 10 minutes.

With respect to the edible fat, it has been found that both animal and vegetable fats may be used. For example, pork fat and beef fat, margarine, butter and safflower oil, and the like, can be employed. While the reactions leading to roast meat odor and flavor are not clearly understood, the heating together of the above mixture under these conditions leads to a very pleasing product, which cannot be obtained when edible fat is not present.

With respect to the temperature at which the process is to be carried out, it has been found that the internal temperature of the mixture must reach at least 110° C. for the desirable roast meat odor to be induced. It is found that merely heating to 90° C. will not provide the desired result.

With respect to time required for development of the roast meat qualities, it is found that a minimum of about 10 minutes is necessary once the temperature of 110° C. has been reached. At 110° C., it is noted that especially pleasing gravy bases are obtained after heating for about 1 hour. The process can be carried out for longer times than 1 hour or at higher temperatures than 110° C., although there is no particular advantage in so doing.

The amount of edible fat to be employed can be varied. Based on the α-ketobutyric acid or salt thereof, for example, there may be employed from about 20 parts of fat per part of said acid to 1000 parts of fat or even more. There appears to be no disadvantage inherent in a decrease of fat below 20 parts. Special mention is made of 140 parts of fat per part of α-ketobutyric acid or salt thereof, which amount seems to provide an especially pleasing result.

While the gravy base can be employed as a heavy, honey-like paste, as is obtained directly from the process, an especially convenient form for consumer use is obtained by allowing the mixture to cool until the excess fat has completely solidified, using refrigeration if necessary, skimming of the fat and recovering the solids from the essentially fat-free phase. These solids, when reconstituted with water or other stocks, possess the desirable roast meat flavor and odor obtainable by the process of heating the novel composition of this invention with edible fat.

There are also contemplated within the scope of the instant invention two embodiments which provide unusual and novel results. These are: (1) the composition of enhanced pungency obtained by adding gamma-methylmercaptopropionaldehyde, known in the art as "methional," to the compositions of this invention and (2) the composition of enhanced mildness in taste and odor which is obtained by adding maltol, a commercially available gamma-pyrone, to the new compositions of the instant invention.

With respect to the embodiment employing methional (gamma-methylmercaptopropionaldehyde), the composition contemplated is, in essence:

(a) A compound selected from the group consisting of α-ketobutyric acid and physiologically-acceptable salts thereof;

(b) A compound selected from the group consisting of inosinic acid and physiologically-acceptable salts thereof in an amount to provide from about 4 to about 100 parts by weight based on said α-ketobutyrate;

(c) A compound selected from the group consisting of glutamic acid and physiologically-acceptable salts thereof in an amount to provide from about 20 to about 1500 parts by weight of said α-ketobutyrate and from about 5 to about 15 parts by weight of inosinate; and (d) Gamma-methylmercaptopropionaldehyde in an amount to provide from about 0.0000004 to about 0.00004 part by weight of said α-ketobutyrate.

If methional is used in an amount to provide less than 0.0000004 part per part based on α-ketobutyrate, most subjects begin to have difficulty in distinguishing its beneficial effect. On the other hand, if more than 0.00004 part are used per part of α-ketobutyrate, the pungent effect begins to overpower the other flavors, according to some of the subjects. It is found particularly effective to employ about 0.00001 part of methional per 1 part of α-ketobutyrate; expressed in another manner, this is 10 parts per million of methional based on α-ketobutyrate.

With respect to the embodiment employing maltol, the composition contemplated is, in essence:

(a) A compound selected from the group consisting of α-ketobutyric acid and physiologically-acceptable salts thereof;

(b) A compound selected from the group consisting of inosinic acid and physiologically-acceptable salts thereof in an amount to provide from about 4 to about 100 parts by weight based on said α-ketobutyrate;

(c) A compound selected from the group consisting of glutamic acid and physiologically-acceptable salts thereof in an amount to provide from about 20 to about 1500 parts by weight based on said α-ketobutyrate and from about 5 to about 15 parts by weight of said inosinate; and (d) Maltol in an amount to provide from about 4 to about 12 parts by weight based on said α-ketobutyrate.

It is observed that if less than 4 parts of maltol per part of α-ketobutyrate is used, the beneficial flavor smoothing and mildness begins to be less readily detected and if more than 12 parts by weight is used, certain less desirable flavor notes are reported by some subjects. The best combination of smoothness and mild flavor appears to follow the use of about 8 parts of maltol per part of α-ketobutyrate.

The following examples are illustrative of the use of the flavoring compositions of the instant invention but are not intended to limit the invention in any way, many variations of which are possible.

EXAMPLE I

A meatless beef-flavored bouillon is prepared by first mixing together 0.25 g. of sodium α-ketobutyrate, 1.3 g. of disodium inosinate and 9.6 g. of monosodium glutamate. To this then is added 10.0 g. of sodium chloride and 43.3 g. of vegetable protein hydrolysate. Twenty-five grams of the mixture thus obtained is added to 684 ml. of water. The mixture is heated on a steam bath to 98 C., is simmered at this temperature for 15 minutes, then is allowed to cool to about 65° C. and is tasted and compared with a bouillon made with beef extract as the sole source of beef flavor. It is found that the meatless bouillon compares in all respects to that containing beef extract and is found to be preferable in flavor by some of the subjects.

A bouillon of good beef flavor is made by mixing 2.5 g. of the mixture of this example with 2.5 g. of beef extract and 12.2 g. vegetable protein hydrolysate soup base, adding the mixture to 684 ml. of water and simmering. This shows that the mixture may be used to replace all or part of the beef extract in a soup.

EXAMPLE II

A meatless beef-flavored gravy is made by heating together a mixture comprised of 7.3 g. of beef fat, 8.66 g. of vegetable protein hydrolysate, 0.256 g. of disodium inosinate, 2.0 g. of sodium chloride, 1.92 g. of monosodium glutamate, 0.0563 g. of sodium α-ketobutyrate and 17 ml. of water. The heating is carried out in such a manner that the mixture thickness due to the evaporation of moisture and the internal temperature reaches 110° C. It is maintained at this temperature for 1 hour then is cooled and a gravy is prepared therefrom. This gravy is compared with a gravy deriving its beef flavor solely from beef extract. It is found that the meatless gravy has a flavor and essence substantially the same as that of the gravy derived from meat and is acceptable in all respects.

EXAMPLE III

Beef-flavored bouillons are prepared by the procedure described in Example I, substituting respectively for sodium α-ketobutyrate, α-ketobutyric acid, potassium α-ketobutyrate, monocalcium di-α-ketobutyric acid and ammonium α-ketobutyrate; respectively for disodium inosinate, inosinic acid, dipotassium inosinate, calcium inosinate and diammonium inosinate; and respectively for monosodium glutamate, glutamic acid, monopotassium glutamate, monocalcium di-glutamic acid and monoammonium glutamate. Fully acceptable beef-flavored bouillons are obtained which are eminently suitable for use by those whose dietary needs require restriction of their intake of sodium.

The procedure of Example II is used to prepare beef-flavored gravies substituting for the sodium salts of α-ketobutyric acid, inosinic acid and glutamic acid, the corresponding free acids, and the potassium, calcium and ammonium salts thereof. Acceptable gravies with roast meat odor and flavor are obtained, which are eminently suitable for those who must restrict their intake of sodium.

EXAMPLE IV

A meaatless beef-flavored gravy base is prepared, which has enhanced pungency and a roast meat flavor by mixing together 1.3 g. of disodium inosinate, 0.25 g. of sodium-α-ketobutyrate, 9.6 g. of monosodium glutamate, 10.0 g. of sodium chloride, 43.3 g. of vegetable protein, 10 parts per million of gamma-methylmercaptopropionaldehyde (methional) based on the α-ketobutyrate, and 35.0 g. of beef fat. A 26 g. portion of the mixture is suspended in 50 ml. of water and the suspension is heated to an internal temperature of 110° C. and maintained at this temperature for 10 minutes. There is obtained an acceptable gravy base.

This base is further treated to recover a solid, substantially fat-free gravy base, by cooling to 5° C., skimming off the fat after it has congealed and evaporating the moisture from the residue. The solid material, when reconstituted as a gravy, possesses a very desirable roast meat flavor.

The procedure is repeated substituting for the 10 parts per million of gamma-methylmercaptopropionaldehyde per part of α-ketobutyrate, respectively, 0.4 part per million and 40 parts per million of gamma-methylmercaptopropionaldehyde. In each case there is obtained a beef-flavored gravy base with enhanced pungency.

EXAMPLE V

A beef-flavored bouillon with a pleasingly mild taste and smooth odor is prepared by mixing 1.3 g. of disodium inosinate, 0.25 g. of sodium α-ketobutyrate, 9.6 g. of monosodium glutamate, 10.0 g. of sodium chloride, 43.3 g. of vegetable protein hydrolysate and 2.0 g. of maltol, taking 2 grams of the mixture, adding it to 684 ml. of water, heating to 980° C. and allowing the suspension to cool.

The procedure is repeated substituting for the 2 g. of maltol, which is equivalent to 8 parts by weight based on the α-ketobutyrate, respectively, 4 parts and 12 parts of maltol. In each case there is obtained a beef-flavored bouillon with a pleasingly mild taste and odor.

EXAMPLE VI

The procedure of Example I is repeated substituting for the mixture of α-ketobutyrate, inosinate, and glutamate at the ratios as set out a series of compositions at different ratios. The following tabulated mixtures are used:

*Table I.—Flavoring compositions*

| Sodium α-ketobutyrate, parts | Disodium inosinate, parts | Monosodium glutamate, parts |
|---|---|---|
| 1 | 4 | 20 |
| 1 | 4 | 60 |
| 1 | 50 | 250 |
| 1 | 50 | 600 |
| 1 | 100 | 500 |
| 1 | 100 | 1,500 |

In all instances, a meatless beef-flavored bouillon is obtained.

EXAMPLE VII

The procedure of Example II is repeated substituting for the mixture of α-ketobutyrate, inosinate and glutamate, mixtures at the ratios set forth in Table I, Example V. Acceptable beef-flavored gravy bases are obtained.

EXAMPLE VIII

The procedure of Example II is repeated substituting for the beef fat, an amount of margarine to provide 20 parts by weight based on the sodium α-ketobutyrate. An eminently satisfactory gravy base is obtained.

What is claimed is:
1. A flavoring composition comprising:
   (a) a compound selected from the group consisting of α-ketobutyric acid and its physiologically-acceptable salts thereof;
   (b) a compound selected from the group consisting of inosinic acid and physiologically-acceptable salts thereof in an amount to provide from about 4 to about 100 parts by weight based on said α-ketobutyrate; and
   (c) a compound selected from the group consisting of glutamic acid and physiologically-acceptable salts thereof in an amount to provide from about 20 to about 1500 parts by weight based on said α-ketobutyrate and from about 5 to about 15 parts by weight based on said inosinate.

2. A soup containing as its principal beef flavor-imparting ingredients:
   (a) a compound selected from the group consisting of α-ketobutyric acid and its physiologically-acceptable salts thereof;
   (b) a compound selected from the group consisting of inosinic acid and physiologically-acceptable salts thereof in an amount to provide from about 4 to about 100 parts by weight based on said α-ketobutyrate and
   (c) a compound selected from the group consisting of glutamic acid and physiologically-acceptable salts thereof in an amount to provide from about 20 to about 1500 parts by weight based on said α-ketobutyrate and from about 5 to about 15 parts by weight based on said inosinate.

3. A gravy containing as its principal beef flavor-imparting ingredients:
   (a) a compound selected from the group consisting of α-ketobutyric acid and its physiologically-acceptable salts thereof;
   (b) a compound selected from the group consisting of inosinic acid and physiologically-acceptable salts thereof in an amount to provide from about 4 to about 100 parts by weight based on said α-ketobutyrate and
   (c) a compound selected from the group consisting of glutamic acid and physiologically-acceptable salts thereof in an amount to provide from about 20 to about 1500 parts by weight based on said α-ketobutyrate and from about 5 to about 15 parts by weight based on said inosinate .

4. A beef-flavored composition with enhanced pungency comprising:
   (a) a compound selected from the group consisting of α-ketobutyric acid and physiologically-acceptable salts thereof;
   (b) a compound selected from the group consisting of inosinic acid and physiologically-acceptable salts thereof in an amount to provide from about 4 to about 100 parts by weight based on said α-ketobutyrate;
   (c) a compound selected from the group consisting of glutamic acid and physiologically-acceptable salts thereof in an amount to provide from about 20 to about 1500 parts by weight of said α-ketobutyrate and from about 5 to about 15 parts by weight of inosinate; and
   (d) gamma - methylmercaptopropionaldehyde in an amount to provide from about 0.0000004 to about 0.00004 part by weight of said α-ketobutyrate.

5. A beef-flavored composition of enhanced mildness and smooth taste which comprises:
   (a) a compound selected from the group consisting of α-ketobutyric acid and physiologically-acceptable salts thereof;
   (b) a compound selected from the group consisting of inosinic acid and physiologically-acceptable salts thereof in an amount to provide from about 4 to about 100 parts by weight based on said α-ketobutyrate;
   (c) a compound selected from the group consisting of glutamic acid and physiologically-acceptable salts thereof in an amount to provide from about 20 to about 1500 parts by weight based on said α-ketobutyrate and from about 5 to about 15 parts by weight of said inosinate; and
   (d) maltol in an amount to provide from about 4 to about 12 parts by weight based on said α-ketobutyrate.

6. A process for preparing a beef-flavored gravy with roast meat flavor and odor which comprises heating:
   (a) a compound selected from the group consisting of α-ketobutyric acid and physiologically-acceptable salts thereof;
   (b) a compound selected from the group consisting of inosinic acid and the physiologically-acceptable salts thereof in an amount to provide from about 4 to about 100 parts by weight based on said α-ketobutyrate;
   (c) a compound selected from the group consisting of glutamic acid and physiologically-acceptable salts thereof in an amount to provide from about 20 to about 1500 parts by weight based on said α-ketobutyrate and from about 5 to about 15 parts by weight of said inosinate, and
   (d) an edible fat in an amount to provide at least about 20 parts by weight based on said α-ketobutyrate to a temperature of at least about 110° C. and maintaining said temperature for at least about 10 minutes.

References Cited by the Examiner
UNITED STATES PATENTS

| | | | |
|---|---|---|---|
| 2,955,041 | 10/1960 | Broderick et al. | 99—140 |
| 3,047,399 | 7/1962 | Landmann et al. | 99—140 X |
| 3,109,741 | 11/1963 | Toi et al. | 99—140 |
| 3,156,569 | 11/1964 | Griffin et al. | 99—140 |

A. LOUIS MONACELL, *Primary Examiner.*

JOSEPH M. GOLIAN, *Examiner.*